United States Patent
Ohbitsu

(10) Patent No.: US 10,491,589 B2
(45) Date of Patent: Nov. 26, 2019

(54) INFORMATION PROCESSING APPARATUS AND DEVICE COORDINATION AUTHENTICATION METHOD

(71) Applicant: FUJITSU CLIENT COMPUTING LIMITED, Kawasaki-shi, Kanagawa (JP)

(72) Inventor: Toshiro Ohbitsu, Akishima (JP)

(73) Assignee: Fujitsu Client Computing Limited (JP)

( * ) Notice: Subject to any disclaimer, the term of this patent is extended or adjusted under 35 U.S.C. 154(b) by 125 days.

(21) Appl. No.: 15/663,794

(22) Filed: Jul. 30, 2017

(65) Prior Publication Data
US 2017/0353449 A1 Dec. 7, 2017

Related U.S. Application Data

(63) Continuation of application No. PCT/JP2015/056811, filed on Mar. 9, 2015.

(51) Int. Cl.
*H04L 29/06* (2006.01)
*G06F 21/31* (2013.01)
*G06F 21/44* (2013.01)

(52) U.S. Cl.
CPC .......... *H04L 63/0853* (2013.01); *G06F 21/31* (2013.01); *G06F 21/44* (2013.01); *H04L 63/083* (2013.01); *H04L 63/0884* (2013.01); *H04L 63/10* (2013.01); *H04L 63/101* (2013.01); *H04L 63/108* (2013.01)

(58) Field of Classification Search
CPC . H04L 63/0853; H04L 63/0884; H04L 63/10; H04L 63/083; H04L 63/101; H04L 63/108; G06F 21/44; G06F 21/31
See application file for complete search history.

(56) References Cited

U.S. PATENT DOCUMENTS 7,562,227 B1* 7/2009 Cox .................. G06F 21/36
                                                713/183
2005/0091539 A1   4/2005 Wang et al.
(Continued)

FOREIGN PATENT DOCUMENTS

JP    11-355266    12/1999
JP    2005-135412   5/2005
(Continued)

OTHER PUBLICATIONS

PCT ISR,,International Search Report of Int. Appl. No. PCT/JP2015/056811 dated May 19, 2015.
(Continued)

*Primary Examiner* — Cheng-Feng Huang
(74) *Attorney, Agent, or Firm* — Harness, Dickey & Pierce, P.L.C.

(57) ABSTRACT

An information processing apparatus includes a processor configured to execute processing. The processing is configured to: receive authentication information for a first terminal device authenticated by an authentication server among a plurality of terminal devices to be authenticated by the same authentication information; obtain authentication information from a second terminal device among the plurality of terminal devices; and authenticate the second terminal device in place of the authentication server based on the authentication information for the first and second terminal devices.

4 Claims, 12 Drawing Sheets

(56) References Cited

U.S. PATENT DOCUMENTS

| | | | | |
|---|---|---|---|---|
| 2007/0240203 A1* | 10/2007 | Beck | ................... | G06F 21/33 |
| | | | | 726/4 |
| 2008/0263362 A1* | 10/2008 | Chen | ................... | G06F 21/31 |
| | | | | 713/184 |
| 2010/0071033 A1* | 3/2010 | Umezawa | ........... | H04L 63/0823 |
| | | | | 726/3 |
| 2012/0297470 A1* | 11/2012 | Kwon | ................ | H04L 9/083 |
| | | | | 726/7 |
| 2013/0117835 A1 | 5/2013 | Oguma et al. | | |
| 2015/0067826 A1* | 3/2015 | Kawakami | ............ | G06F 21/316 |
| | | | | 726/19 |

FOREIGN PATENT DOCUMENTS

| | | |
|---|---|---|
| JP | 2006-309587 | 11/2006 |
| JP | 2008-152666 | 7/2008 |
| JP | 2010-045618 | 2/2010 |
| JP | 2013-097744 | 5/2013 |
| JP | 2013-117748 A | 6/2013 |

OTHER PUBLICATIONS

PCT ISA,,Written Opinion of the International Searching Authority of Int. Appl. No. PCT/JP2015/056811 dated May 19, 2015 translation of the relevant part.

Office Action for JP Application No. 2017-504451, dated Oct. 9, 2018 (6 pages).

\* cited by examiner

FIG.3

| No. | SERVICE SERVER ID | SERVICE CONTENT | | TERMINAL DEVICE INFORMATION |
|---|---|---|---|---|
| | | MODULE | SERVICE PERMISSION INFORMATION | |
| 0001 | A | SERVICE A | PERMITTED | TERMINAL DEVICE A |
| | | SERVICE B | PERMITTED | TERMINAL DEVICE B |
| | | SERVICE C | NOT PERMITTED | |
| 0002 | B | SERVICE AA | PERMITTED | TERMINAL DEVICE AA |
| | | SERVICE BB | PERMITTED | TERMINAL DEVICE BBB |
| | | SERVICE CC | PERMITTED | TERMINAL DEVICE CCC |

FIG.4

| No. | ID | PASSWORD | TERMINAL DEVICE INFORMATION | GIP |
|---|---|---|---|---|
| 0001 | 0001ABC | 1234 | TERMINAL DEVICE A | xxx.xxx.1.xxx |
| | | | TERMINAL DEVICE B | xxx.xxx.1.yyy |
| | | | | |
| 0002 | 0001DEF | 5678 | TERMINAL DEVICE AA | xxx.xxx.1.aaa |
| | | | TERMINAL DEVICE BBB | xxx.xxx.1.bbb |
| | | | TERMINAL DEVICE CCC | xxx.xxx.1.ccc |

FIG.5

| No. | ID | PASSWORD | DURATION INFORMATION | HEADER INFORMATION | SERVICE CONTENT MODULE |
|---|---|---|---|---|---|
| 001 | 0001ABC | 1234 | 201401010000 | SERVICEAP.serviceA.tokyo.or.jp | A |
| 002 | 0001DEF | 5678 | 201402021212 | SERVICEAP.serviceB.sendai.or.jp | B |
| 003 | 0001GH | 9999 | 201403031515 | SERVICEAP.serviceC.oosaka.or.jp | C |

FIG.8

| No. 261 | ID 262 | PASSWORD 263 | TERMINAL DEVICE INFORMATION 264 | GIP 265 | LOGON INFORMATION 266 | SERVICE NOTIFICATION INFORMATION 267 |
|---|---|---|---|---|---|---|
| 0001 | 0001ABC | 1234 | TERMINAL DEVICE A | xxx.xxx.1.xxx | ON | DONE |
| | | | TERMINAL DEVICE B | xxx.xxx.1.yyy | OFF | UNDONE |
| 0002 | 0001DEF | 5678 | TERMINAL DEVICE AA | xxx.xxx.1.aaa | ON | DONE |
| | | | TERMINAL DEVICE BBB | xxx.xxx.1.bbb | ON | DONE |
| | | | TERMINAL DEVICE CCC | xxx.xxx.1.ccc | OFF | DONE |

INFORMATION PROCESSING APPARATUS AND DEVICE COORDINATION AUTHENTICATION METHOD

CROSS-REFERENCE TO RELATED APPLICATION

This application is a continuation application of International Application PCT/JP2015/056811 filed on Mar. 9, 2015 and designated the U.S., the entire contents of which are incorporated herein by reference.

FIELD

The embodiment discussed herein relates to an information processing apparatus, a computer-readable recording medium, and a device coordination authentication method.

BACKGROUND

A business is proposed for providing a predetermined service to a user having a plurality of terminal devices such as personal computers, tablet terminal devices, or mobile terminal devices coupled to the internet via a service server that provides services to terminal devices.

In order for a single user to receive a service from a service server with the use of a plurality of terminal devices, performing authentication processing using the same ID and the same password (referred to as "ID/PW" hereinafter) for the respective terminal devices is burdensome. Thus, a single sign-on technique is known in the related art (for example, see Patent Document 1). According to the single sign-on technique, when a logon operation is once performed by any of a plurality of terminal devices, a service can be used in the plurality of terminal devices.

There may be a case in which one terminal device of a plurality of terminal devices request an authentication server to change a plurality of services simultaneously, and after the requested processing is normally completed, another terminal device of the plurality of terminal devices is coupled to a service server by an ID/PW that is the same as that of the one terminal device in order to use new services. In this case, the authentication server determines a service with respect to the terminal device that inputs the ID/PW by an individual ID to the service server. At that time, there is a method (method 1) in which the authentication server and service servers always coordinate, and when the another terminal device is coupled to an intended service server, the service server performs substitute authentication for the authentication server to continuously provide a service. Further, there is a method (method 2) in which the another terminal device is necessarily coupled to the authentication server, and after being authenticated, the another terminal device is coupled to respective service servers in accordance with information for respective services managed by the authentication server.

However, in the single sign-on technique, one ID/PW is transmitted from one terminal device to another terminal device, and the another terminal device waits for the ID/PW transmitted from the one terminal device while being coupled to the internet. Thus, even when the one terminal device is authenticated by the ID/PW and a module for using a new service is registered, there is no means for transmitting the module for using the new service to the another terminal device because the another terminal device is not coupled to the service server that provides the new service. Hence, it is difficult for the another terminal device to obtain the module for using the new service and to use the new service.

Further, in the method 1, service servers have to understand services with respect to IDs held by the authentication server. Therefore, the authentication server frequently updates information with respect to each of the service servers, and the communication volume between the authentication server and the service servers is enormous.

Further, in the method 2, the terminal device of the user is necessarily coupled to the authentication server, and after being authenticated, the terminal device is coupled to service servers in accordance with services for respective IDs managed by the authentication server. Accordingly, all terminal devices use services via the authentication server, the terminal devices and the authentication server are very frequently accessed, and a processing load of a CPU of the authentication server is high.

RELATED-ART DOCUMENTS

Patent Documents

[Patent Document 1] Japanese Laid-open Patent Publication No. 2013-97744

SUMMARY

According to an aspect of the embodiments, an information processing apparatus includes a processor configured to execute processing. The processing includes receiving authentication information for one terminal device authenticated by an authentication server among a plurality of terminal devices to be authenticated by same authentication information; obtaining authentication information from another terminal device among the plurality of terminal devices in authenticating said another terminal device; and authenticating said another terminal device in place of the authentication server based on the authentication information for said another terminal device and based on the authentication information for the one terminal device.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 3 is a diagram illustrating an example of a service management DB according to the embodiment;

FIG. 4 is a diagram illustrating an example of an ID management DB according to the embodiment;

FIG. 5 is a diagram illustrating an example of an authentication table according to the embodiment;

FIG. 8 is a diagram illustrating an example of a logon management DB according to the embodiment;

DESCRIPTION OF EMBODIMENT

In the following, an embodiment of the present invention will be described with reference to the accompanying drawings. One aspect of the embodiment is to reduce access between an authentication server that authenticates terminal devices and a service server that provides a service to the terminal devices. It should be noted that, in the following descriptions and drawings, the same reference numbers are given to elements having substantially the same functions such that overlapping descriptions may be omitted as appropriate.

[Entire configuration of a device coordination authentication system]

Figure 1:
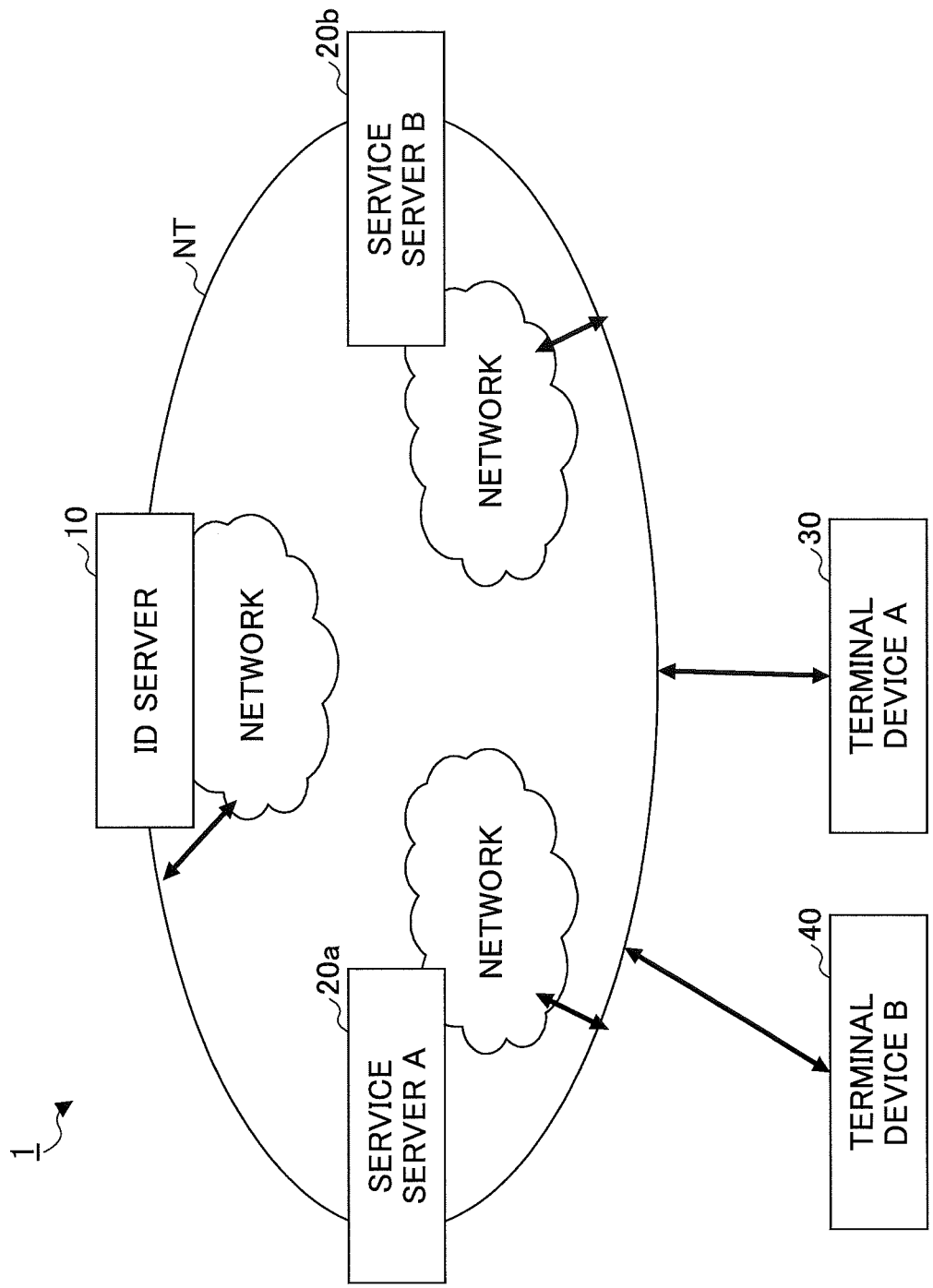
FIG. 1 is a diagram illustrating an example of an entire configuration of a device coordination authentication system according to an embodiment.

First, a configuration of a device coordination authentication system 1 according to an embodiment of the present invention will be described with reference to FIG. 1. In the device coordination authentication system 1 according to the embodiment, an ID server 10 and a service server A 20a, a service server B 20b coordinate to authenticate terminal devices.

The device coordination authentication system 1 includes the ID server 10, the service server A 20a, the service server B 20b, a terminal device A 30, and a terminal device B 40. The ID server 10, the service server A 20a, and the service server B 20b are arranged on a cloud and are coupled via a network NT.

The ID server 10 is an example of an authentication server that authenticates terminal devices. The ID server 10 determines, with respect to terminal devices authenticated by IDs/PWs, a provision range of services depending on the IDs.

The service server A 20a and the service server B 20b provide a plurality of different services to the terminal device A 30 and the terminal device B 40 in the provision range of the services determined by the ID server 10. Although a user has two terminal devices that are the terminal device A 30 and the terminal device B 40 in the embodiment, the user may have three or more terminal devices. The terminal device A 30 and the terminal device B 40 are an example of an information processing apparatus that a same user who uses the device coordination authentication system has. For example, the information processing apparatus may be a Personal Computer (PC) or a portable type terminal device such as a smartphone, a portable type game device, a Personal Digital Assistant (PDA), a portable type music device, or a tablet terminal. In such a state, the user has completed in advance, on the ID server 10, registration of an ID/PW and registration of the terminal device A 30 and the terminal device B 40 to be authenticated by the same ID/PW.

According to the device coordination authentication system 1 having the above described configuration, the terminal device A 30 and the terminal device B 40 are connected to the ID server 10, the service server A 20a, and the service server B 20b by the ID/PW. The terminal device A 30 and the terminal device B 40 request using or changing a service, and receive a predetermined service provided from the service server A 20a or the service server B 20b upon being authenticated by the ID/PW. In provision of predetermined services, the terminal device A 30 and the terminal device B 40 are required to install modules of service applications (which may be referred to as "service app", hereinafter) for using the predetermined services from the respective service servers A 20a and B 20b. For example, in order to receive a service A provided, it is required to install a module of the service A in the terminal device A 30 and the terminal device B 40.

[Functional configuration]

Figure 2:
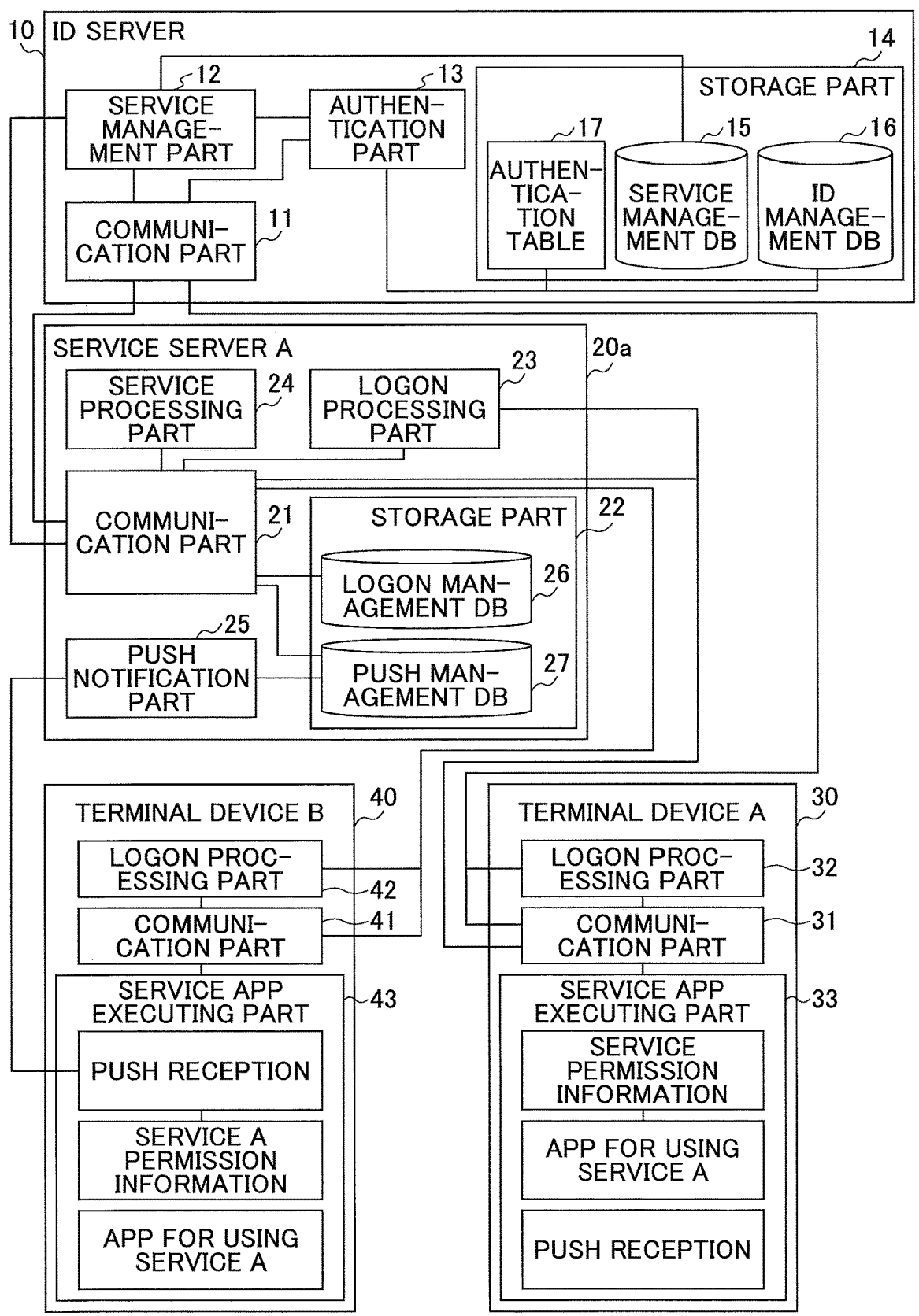
FIG. 2 is a diagram illustrating an example of functional configurations of respective servers and respective devices according to the embodiment.

Next, examples of respective configurations of the ID server 10, the service server A 20a, the terminal device A 30, the terminal device B 40 of the device coordination authentication system 1 according to the embodiment will be described with reference to FIG. 2.

In the following description, the user uses the terminal device A 30, which is one of a plurality of terminal devices that the user has, to request the ID server 10 to change a service (or to provide a new service), and the ID server 10 authenticates the terminal device A 30. In a case where the authentication is successful, the ID server 10 determines one or more services to be provided by the service server A 20a to the terminal device A 30 that inputs an ID/PW by an individual ID.

According to the embodiment, when authentication processing is performed on one terminal device among a plurality of terminal devices that the user has, each service server performs authentication on one or more other terminal devices receiving duration information that represents duration for authenticating said another terminal device in place of the authentication server, and the ID server 10. Here, an example is described in which the ID server 10 performs authentication processing on the terminal device A 30, and the service server A 20a performs authentication of the other terminal device B 40 in place of the ID server 10. Thus, it is possible to reduce access between the service server A 20a and the ID server 10. As a result, it is possible to reduce costs to the servers.

The ID server 10 includes a communication part 11, a service management part 12, an authentication part 13, and a storage part 14. The communication part 11 transmits/receives data to/from the service server A 20a and the terminal device A 30. The communication part 11 receives an ID/PW input through a logon operation of the terminal device A 30.

In response to a request from the terminal device A 30 to change a service, the service management part 12 confirms, according to a service management DB 15, whether to be able to provide the service requested to be changed. FIG. 3 illustrates an example of the service management DB 15 stored in the storage part 14. The service management DB 15 stores information including NOs. 151, service server IDs 152, service contents (module and service permission information information) 153 and terminal device information 154.

In this way, for the respective service server IDs 152, the usable service contents 153 and terminal device information 154 used by the corresponding service server IDs 152 are registered in the service management DB 15. Device information depending on a BIOS that a terminal device individually has may be registered in the terminal device 154. The service server A 20a can determine whether a service content requested from the terminal device A 30 is a permitted service or a service that is not permitted, by accessing the service management DB 15 to search the service server ID 152. Further, the service server A 20a can confirm a newly changed service by accessing the service management DB 15.

In a case of having confirmed that the service requested to be changed can be provided, the service management part 12 reports service permission information to the terminal device A 30. Subsequently, the service management part 12 registers, in a logon management DB 26 of the service server A 20a, information such as the ID so that other terminal devices can also use the service requested to be changed (or a new service).

FIG. 4 illustrates an example of an ID management DB 16 stored in the storage part 14. The ID management DB 16 stores information including Nos. 161, IDs 162, passwords 163, terminal device information 164, and global IP addresses (which may be referred to as "GIPS" hereinafter) 165.

In the ID management DB 16, the IDs 162 and the passwords 163 are registered, and terminal devices to which push notification is to be performed and usable by the corresponding IDs 162 can be specified based on the terminal device information 164. Further, the GIPs 165 for notifying the terminal devices specified by the terminal device information 164 are registered. The information for the GIP 165 may be used as one of information for when performing authentication of the terminal device.

The authentication part 13 performs ID authentication for a specific terminal device by searching for the ID/PW according to the ID management DB16.

Figure 6:
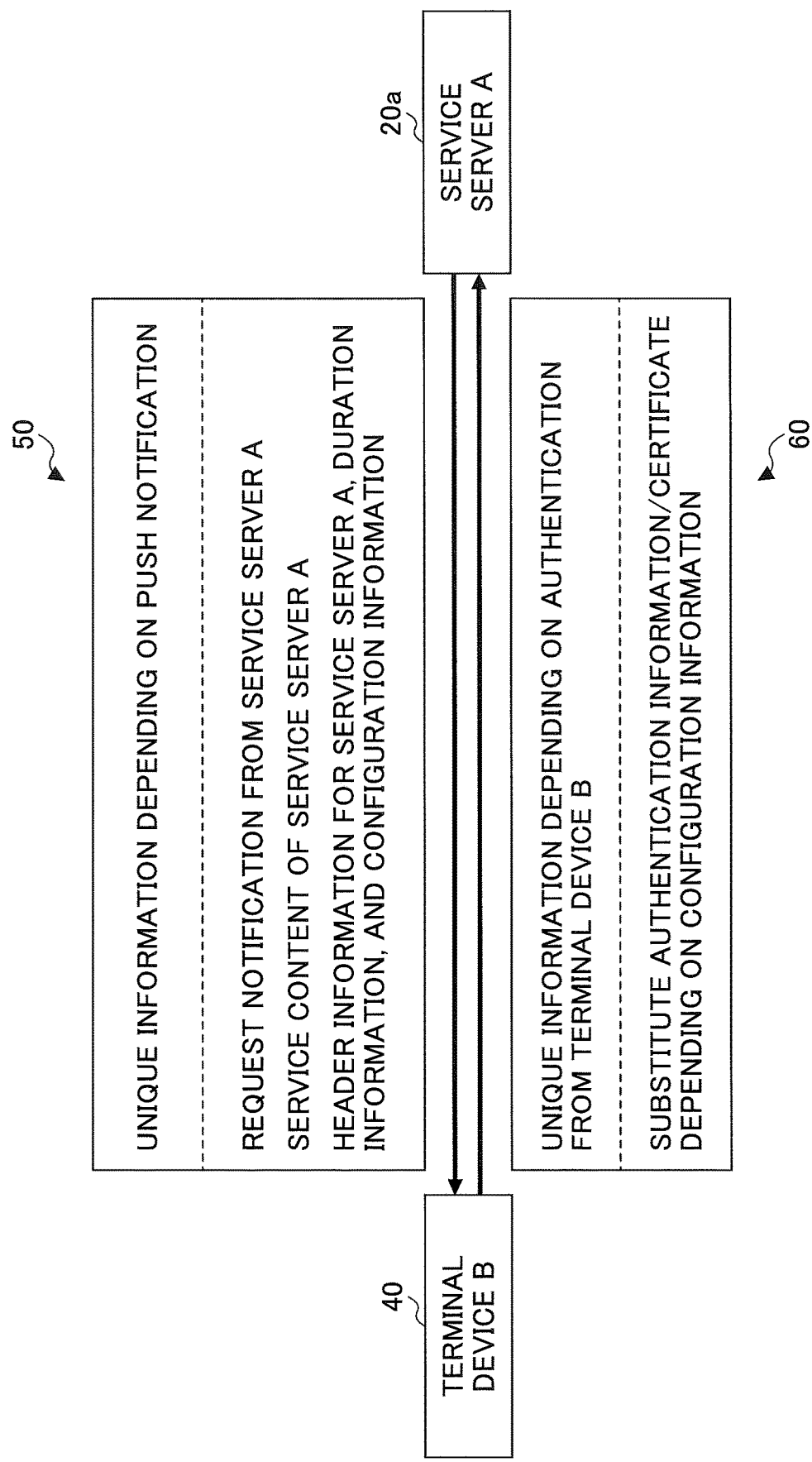
FIG. 6 is a diagram illustrating an example of unique information according to the embodiment.

As illustrated in FIG. 6, unique information 50 depending on a push notification is transmitted to the terminal device B 40 side from the service server A 20a, and is held in the terminal device B 40 side. Further, unique information 60 depending on the authentication from the terminal device B 40 is transmitted to the service server A 20a from the terminal device B 40, and is held in the service server A 20a side.

The unique information 50 depending on the push notification includes a request notification of the service server A 20a that means the information is transmitted from the service server A 20a. Further, the unique information 50 includes information that represents the service content of the service server A 20a, header information for the service server A 20a, duration information that represents duration by which substitute authentication needs to be completed, and configuration information.

According to the embodiment, the unique information 50 is stored at the terminal device B 40 side, and is stored in an authentication table 17 that includes duration information and header information for coupling to the service server A 20a and for understanding the service content when performing authentication processing on the service server A 20a. A program for executing the service content is associated with this unique information.

FIG. 5 illustrates an example of the authentication table 17 stored in the storage part 14. The authentication table 17 stores information including Nos. 171, IDs 172, passwords 173, duration information 174, header information 175, and service contents (modules) 176.

A case will be described as an example in which the NO. 171 is "001". In this case, the ID 172 is "0001ABC" and the password 173 is "1234" that are an ID and a password to be used when a logon operation is performed from either the terminal device A 30 or the terminal device B 40. The duration information 174 represents a time by which the ID server 10 needs to complete substitute authentication for the terminal device B 40 in terms of security when the service A becomes able to be used by the terminal device A 30. In a case where the No. 171 is "001", "Jan. 1, 2014 00:00" is the deadline for the substitute authentication. Service servers to be connected are described in the header information 175. The terminal device B 40 can recognize that the service server A 20a is to be connected in the case where the No. 171 is "001".

When an app that can obtain unique information depending on a push notification is operated by an OS of the terminal device B 40, a service app in which "SERVICEAP" is described in the header information 175 corresponds to the app that can obtain the unique information depending on the push notification. In addition to the information described above, the service contents 176 are stored in the authentication table 17. The modules are stored as the service contents 176.

The unique information stored in the authentication table 17 can be distinguished by the ID 172 and the password 173.

Configuration information is set, in the push management DB 27, as a rule between the ID server 10 and the service server A 20a, and includes access authority for permitting the terminal device B 40 to access the service server A 20a without via the ID server 10.

Figure 7:
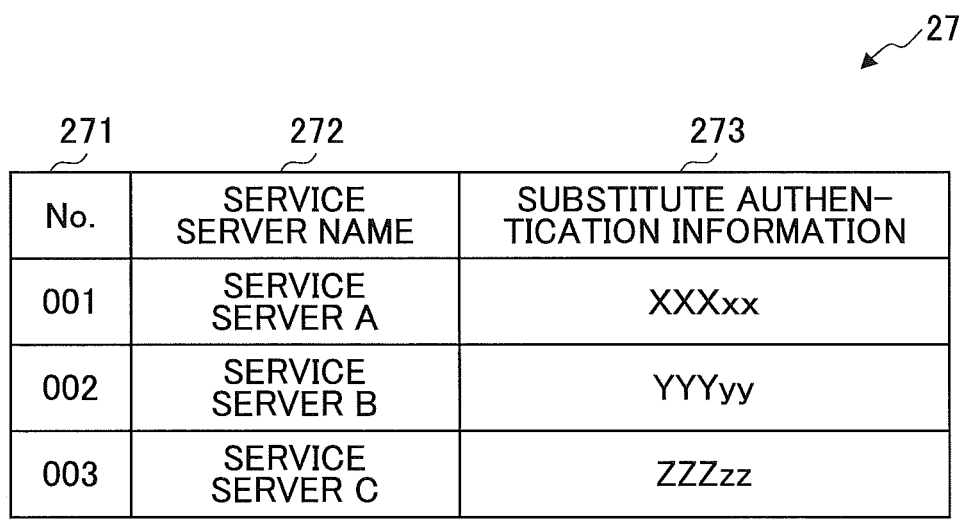
FIG. 7 is a diagram illustrating an example of a push management DB according to the embodiment.

FIG. 7 illustrates an example of a push management DB 27. The push management DB 27 stores information including Nos. 271, service server names 272, and substitute authentication information 273. Access authority for allowing the terminal device B to access the service server A 20a is set for each service server by substitute authentication information 273.

The unique information 60 of FIG. 6 is unique information that is transmitted from the terminal device B 40 to the service server A 20a. The terminal device B 40 may be coupled to the service server A 20a by the ID/PW or may be connected to the service server A 20a by the unique information 60 depending on the configuration information to which the access authority is given. The terminal device B 40 transmits the substitute authentication information 273 for the service server A specified by the service server name 272 that is a coupling destination based on the push management DB 27.

Referring back to FIG. 2, the service server A 20a includes a communication part 21, a storage part 22, a logon processing part 23, a service processing part 24, and a push notification part 25. The communication part 21 transmits/ receives data to/from the ID server 10, the terminal device A 30, and the terminal device B 40.

The storage part 22 includes the logon management DB 26 and the push management DB 27. FIG. 8 illustrates an example of the logon management DB 26. The logon management DB 26 stores information including Nos. 261, IDs 262, passwords 263, terminal device information 264, GIPs 265, logon information 266, and service notification information 267.

In this way, for each ID 262, the terminal device information 264, the GIP 265, and the logon information 266, which represents whether the terminal device is in a logon state with respect to the service server, are registered in the logon management DB 26. Additionally, the service notification information 267 that represents whether a service notification has been transmitted to the registered terminal device is registered in the logon management DB 26.

Referring back to FIG. 2, the logon processing part 23 authenticates the terminal device B 40 in place of the ID server 10 when the ID/PW is input from the terminal device B 40. The service processing part 24 executes service processing that the service server A 20*a* provides. The push notification part 25 performs a push notification to the terminal device B 40. The unique information 50 at that time is identified as unique information to be transmitted to the terminal device B 40 depending on the ID 172 and the password 173.

Unique information depending on an authentication request to the service server A 20*a* from the terminal device B 40 is converted into substitute authentication by a service app using the above described configuration information. Thereby, the substitute authentication for the service server A 20*a* is performed.

Referring back to FIG. 2, the terminal device A 30 includes a communication part 31, a logon processing part 32, and a service app executing part 33. The logon processing part 32 inputs an ID and a password in response to a logon operation of the user. The communication part 31 transmits/receives data to/from the ID server 10 and the service server A 20*a*. The communication part 31 transmits, to the ID server 10, the input ID and the input password. The service app executing part 33 provides a predetermined service to the user by executing a module of an installed service app.

Similar to the terminal device A 30, the terminal device B 40 includes a communication part 41, a logon processing part 42, and a service app executing part 43, and has functions that are the same as the internal functions of the terminal device A 30. Therefore, their descriptions are omitted here.

[Coordination authentication processing]

Figure 9:
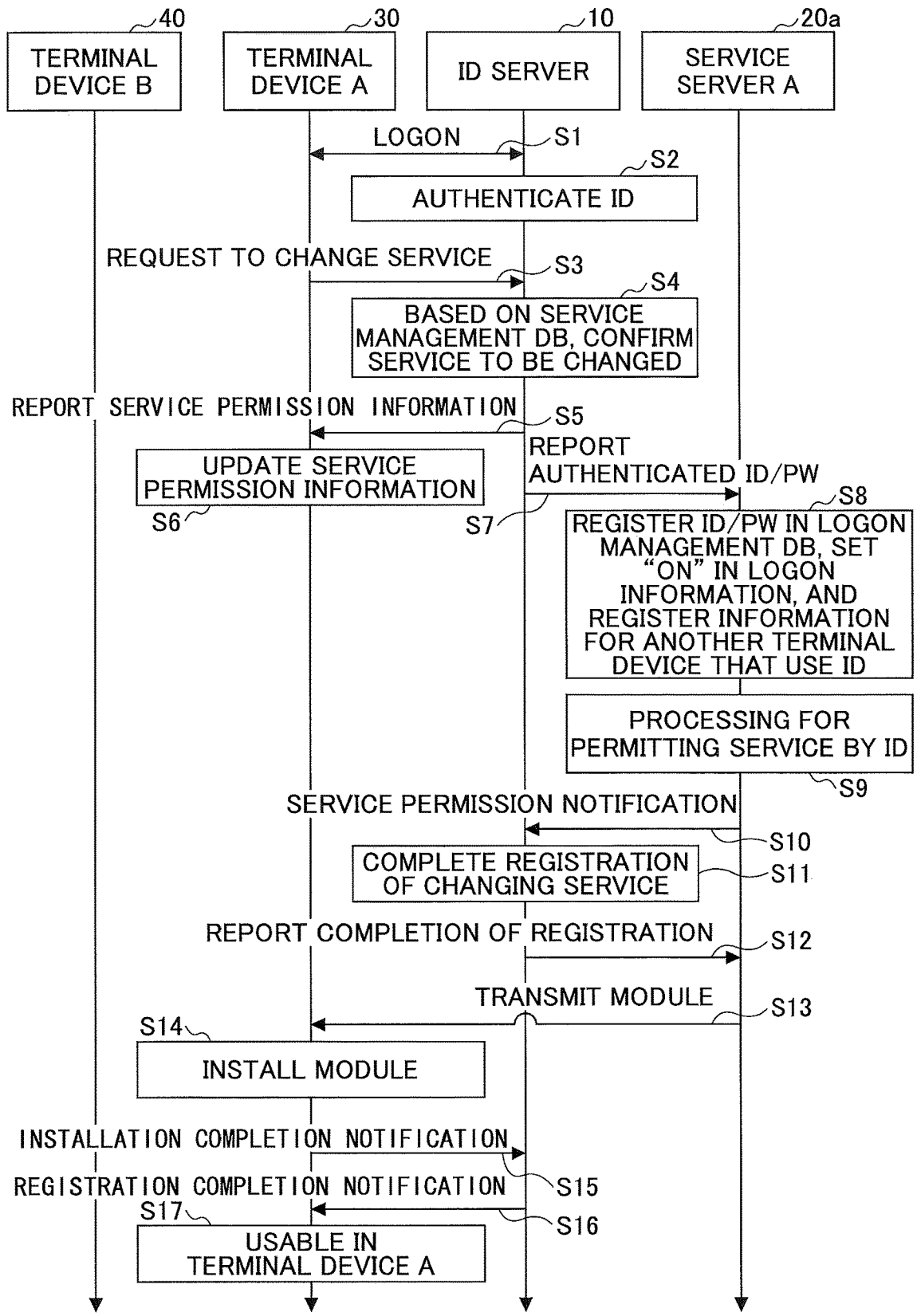
FIG. 9 is a flowchart illustrating an example of a flow of coordination authentication processing of each device according to the embodiment.
Figure 10:
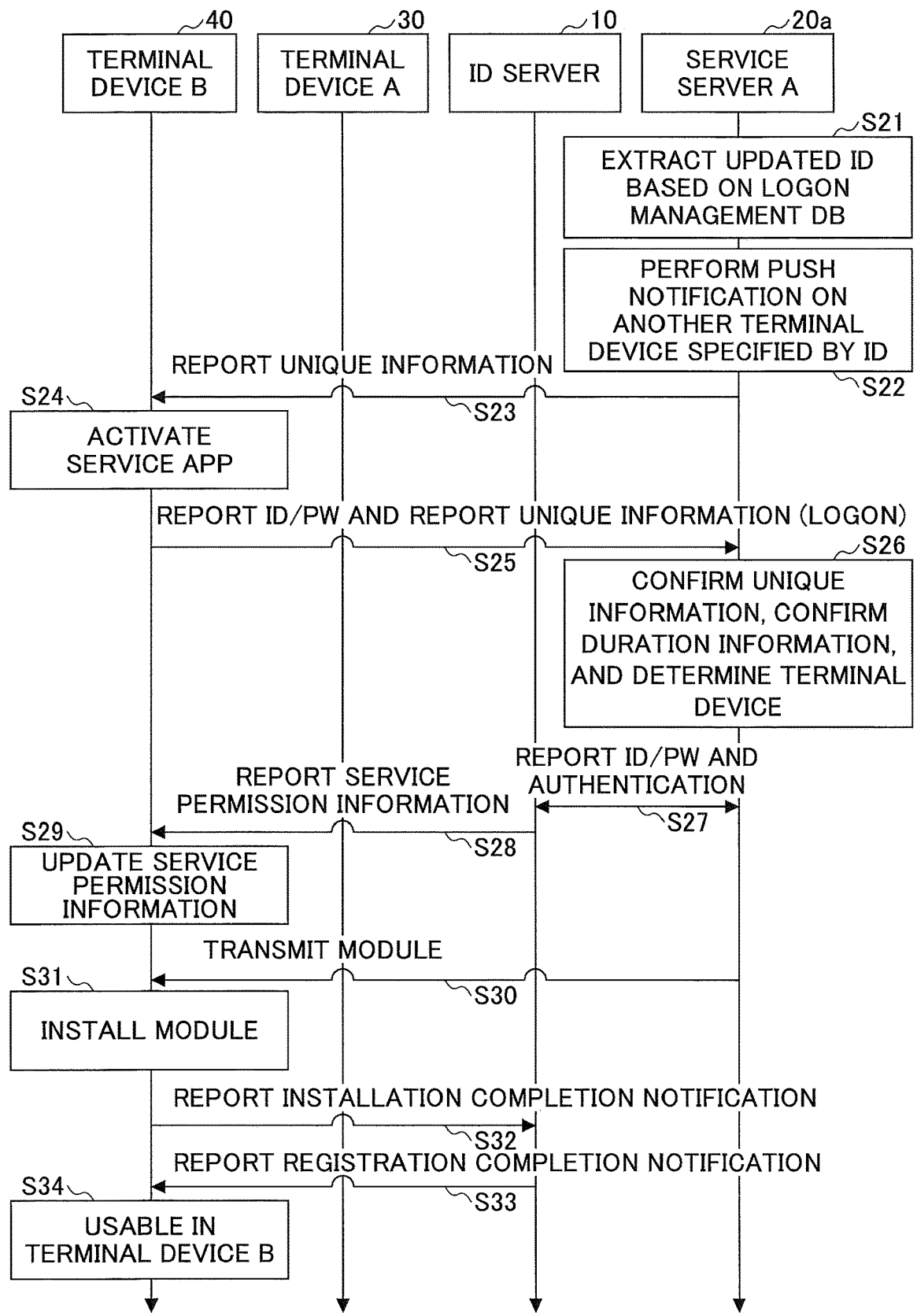
FIG. 10 is a flowchart illustrating an example of a flow of coordination authentication processing of each device according to the embodiment.

Next, coordination authentication processing according to the embodiment will be described with reference to FIG. 9 and FIG. 10. FIG. 9 and FIG. 10 illustrate the flow of processing of each device according to the embodiment, in which one terminal device A 30 requests to change a service, and the other terminal device B 40 is permitted to use the service requested. Specifically, FIG. 9 illustrates the flow of processing from when the terminal device A 30 requests to change the service to when the changed service becomes able to be used at the terminal device A 30. FIG. 10 illustrates the flow of processing in which the service server A 20*a* vicariously authenticates the other terminal device B 40 and the changed service becomes able to be used at the terminal device B 40.

(Processing of the terminal device A for using the service A)

(Step S1) When the processing of FIG. 9 is started, the logon processing part 32 of the terminal device A 30 receives an ID and a password input by the user, and the communication part 31 transmits, to the ID server 10, the received ID, the received password, and terminal device information for the terminal device A 30.

(Step S2) The communication part 11 of the ID server 10 receives the ID, the password, and the information (terminal device information) on the terminal device A 30. Next, the authentication part 13 determines whether there are an ID, a password, and terminal device information that match the received ID, the received password, and the received terminal device information among the IDs 162, the passwords 163, and the terminal device information 164 registered in the ID management DB 16. The authentication part 13 determines that the authentication is successful in a case where they match, and determines that the authentication fails in other cases. After the authentication part 13 completes the ID authentication, the communication part 11 reports, to the terminal device A 30, the authentication result.

(Step S3) The communication part 31 of the terminal device A 30 receives the authentication result. In a case where the authentication is successful, the service app executing part 33 receives input of a service requested to be changed. In response to the input of the service requested to be changed, the communication part 31 transmits, to the ID server 10, a request to change the service, and the communication part 11 receives the request to change the service. For example, in a case where the terminal device A 30 requests to change the service A, the communication part 11 receives the request to change the service A.

(Step S4) The service management part 12 confirms whether the service A, requested to be changed, is registered in the service management DB stored in the ID server 10. Specifically, the service management part 12 confirms whether the service A is registered and the use of the service A is "permitted", based on the modules and the service permission information of the service contents 153 and the terminal device information 154 stored in the service management DB 15. Further, the service management part 12 determines, based on the service server IDs 152, a service server that provides the service A.

(Step S5) In a case where the service management part 12 determines that the service A is registered, the authentication part 13 generates service permission information that represents permission to change the service A. The communication part 11 reports the service permission information to the terminal device A 30.

(Step S6) The communication part 31 of the terminal device A 30 receives the service permission information. The service app executing part 33 updates the service permission information by using the received service permission information. In this way, the service permission information for the service app A is installed in the terminal device A 30.

(Step S7) After reporting the service permission information to the terminal device A 30, the communication part 11 reports the ID/PW authenticated in step S2 to the service server A 20*a*.

(Step S8) The service server A 20 registers the received ID/PW as an ID 262 and a password 263 of the logon management DB 26, and sets "ON" in the logon information 266 such that the service A can be used by the input ID. Further, the service server A 20 registers, in the terminal device information 264 of the logon management DB 26, information for one or more other terminal devices that use the received ID. Here, the terminal device B 40 is registered as information for another terminal device that uses the received ID "0001ABC".

(Step S9) The service processing part 24 performs service permission processing for permitting the service by the authenticated ID.

(Step S10) The communication part 21 transmits the service permission notification to the ID server 10.

(Step S11) The communication part 11 of the ID server 10 receives the service permission notification. In response to receiving the service permission notification, the service management part completes the registration of changing the service A. In this way, the registration of the service A by the ID is completed at the ID server 10 side.

(Step S12) The communication part 11 reports the completion of registration to the service server A 20a.

(Step S13) The push notification part 25 transmits, to the terminal device A 30, a module for executing the service. Here, the module A for executing a Web service app (which is an app for using the service A) provided by the service server A is transmitted to the terminal device A 30.

(Step S14) The communication part 31 of the terminal device A 30 receives the module, and the service app executing part 33 installs the module A (app for using the service A).

(Step S15) The communication part 31 of the terminal device A 30 transmits, to the ID server 10, an installation completion notification.

(Step S16) In response to receiving the installation completion notification, the communication part 11 of the ID server 10 transmits, to the terminal device A 30, a registration completion notification.

(Step S17) The terminal device A 30 becomes able to use the module A.

(Processing of the terminal device B 40 for using the service A)

Next, the processing will be described with reference to FIG. 10 in which the service server A 20a authenticates the other terminal device B 40 in place of the ID server 10 and the changed service becomes able to be used by the terminal device B 40.

(Step S21) When the processing of FIG. 10 is started, the push notification part 25 of the service server A 20a extracts, from the IDs 262, an ID, for which "ON" is set in the logon information 266 and "DONE" is set in the service notification information 267, based on the logon management DB 26.

(Step S22) The push notification part 25 performs, based on the terminal device information 264 of the logon management DB 26, push notification to another terminal device distinguished by the extracted ID. Here, the push notification is performed on the terminal device B 40 identified by the ID, and it is reported to the terminal device B that the app for using the service has been changed.

(Step S23) The push notification part 25 reports the unique information to the global IP address (GIP) of the terminal device B 40. As illustrated in an example of FIG. 6, the unique information depending on the push notification includes the request notification, the duration information given by the ID server 10, the header information for activating the service app, the service content information (including the service permission information), and the configuration information. Note that the duration information is not necessarily included in the unique information. Here, the configuration information is the substitute authentication information 273 "XXXxx", of which the service server name 272 is "SERVER A", stored in the push management DB 27.

Note that in a case where the unique information is transmitted to the terminal device B 40 within an in-house LAN, a private IP address is designated for the address of the terminal device B 40. In a case where the terminal device B 40 is coupled to an external network, the private IP address and the GIP address are designated or only the GIP address is designated for the address of the terminal device B 40.

(Step S24) Referring back to FIG. 10, when the service app executing part 43 of the terminal device B 40 receives the push notification, the service app is activated. Here, the intended service app may be activated in response to an operation manually performed by the user of the terminal device B 40 or the intended service app may be activated by coordination processing executed by the terminal device B 40 using an OS system.

(Step S25) The logon processing part 42 of the terminal device B 40 designates an ID/PW manually input or a stored ID/PW. The communication part 41 transmits, to a service server (which is the service server A 20a) specified by the header information of the unique information, the designated ID/PW and the unique information to perform a logon operation.

In this way, the service server A 20a becomes able to perform authentication in place of the ID server 10. That is, by including the logon processing part 23 and the logon management DB 26, the service server A 20a can perform authentication processing in place of the ID server 10. Only in a case where unique information is transmitted together with an ID/PW at the time of logon operation from the terminal device B 40, the service server A 20a performs substitute authentication.

As illustrated in an example of FIG. 6, the unique information 60 depending on the authentication from the terminal device B 40 at this time includes certification and substitute authentication information depending on the configuration information. Here, the substitute authentication information corresponds to the substitute authentication information "XXXxx" for the "SERVICE SERVER A" included in the unique information 50. The unique information may include the duration information included in the unique information depending on the push notification.

(Step S26) Referring back to FIG. 10, the communication part 21 of the service server A 20a receives the ID/PW and the unique information. The logon processing part 23 compares the received ID/PW to authenticate the terminal device B 40. Specifically, the logon processing part 23 determines whether an ID 262 and a password 263 of the logon management DB 26 match the received ID/PW. In a case where they match, the logon processing part 23 determines that the authentication of the terminal device B 40 is successful. In a case where they do not match, the logon processing part 23 determines that the authentication of the terminal device B 40 fails.

In a case where the unique information includes duration information, the logon processing part 23 determines that the authentication of the terminal device B 40 is successful when the password 263 of the terminal device B match the received ID/PW and it is within the duration represented by the duration information and the ID 262. In this way, the terminal device B 40 accepts the authentication including the duration by involving the duration information in the unique information.

In a case where it is not within the duration represented by the duration information, the logon processing 23 causes the terminal device B to output an error indication. In this way, after confirming the duration information and confirming that the terminal device B 40 is a registered device, the substitute authentication for the terminal device B 40 is performed by the service server A 20a. If it is not within the duration represented by the duration information, the device is not coupled to the service server A 20a. Thereby, it is possible to structure a higher security system.

(Step S27) The communication part 21 of the service server A 20a transmits the successfully authenticated ID/PW to the ID server 10, and reports that the service server A 20a has performed authentication processing in place of the ID server 10. In this way, coordination is executed between the service server A 20a and the ID server 10.

(Step S28) The authentication part 13 of the ID server 10 generates service permission information that represents permission to change the service A, and the communication part 11 reports the service permission information to the terminal device B 40.

(Step S29) The communication part 41 of the terminal device B 40 receives the service permission information. The service app executing part 43 updates the service permission information by using the received service permission information. In this way, the service permission information for the service app A is installed in the terminal device B 40.

(Step S30) The push notification part 25 transmits, to the terminal device B 40, the module of the service content 153 corresponding to the "server A" of the service server ID 152 stored in the service management DB 15 that the ID server 10 stores. Here, the module A for executing the Web service app (which is the app for using the service A) provided by the service server A is transmitted to the terminal device B 40.

(Step S31) The communication part 41 of the terminal device B 40 receives the module, and the service app executing part 43 installs the module A (app for using the service A).

(Step S32) The communication part 41 of the terminal device B 40 transmits, to the ID server 10, an installation completion notification.

(Step S33) In response to receiving the installation completion notification, the communication part 11 of the ID server 10 transmits, to the terminal device B 40, a registration completion notification.

(Step S34) The terminal device B 40 becomes able to use the module A.

[Authentication/installation processing of terminal device A]

Figure 11:
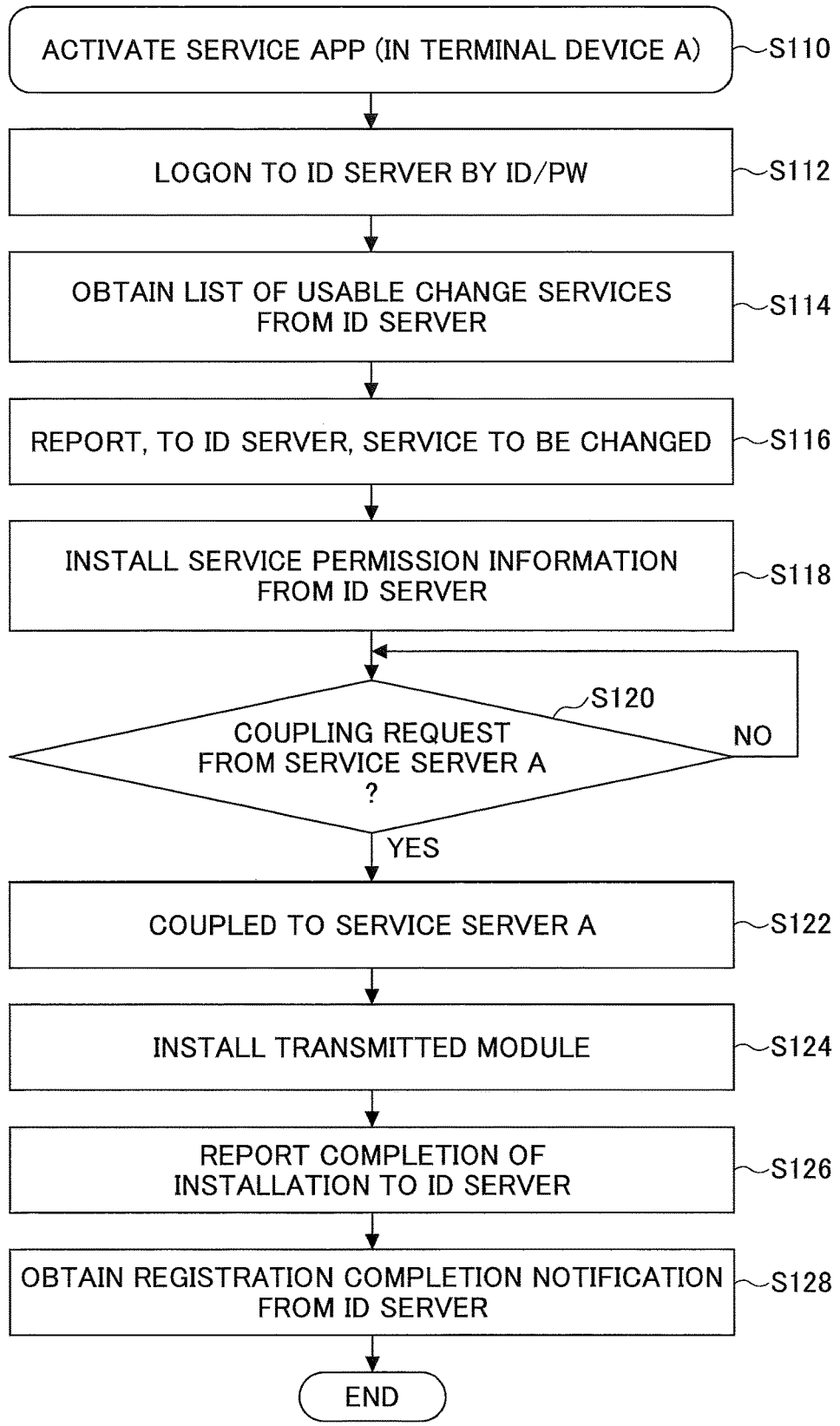
FIG. 11 is a flowchart illustrating an example of authentication/installation processing of a terminal device A according to the embodiment.

Next, authentication/installation processing of the terminal device A 30 according to the embodiment will be described with reference to FIG. 11. When the processing of FIG. 11 is started, the service app executing part 33 of the terminal device A 30 activates the service app in step S110. The logon processing part 32 transmits the ID/PW to logon to the ID server 10 in step S112. The communication part 31 obtains information for a list of change services created by the ID server 10 usable as Web apps, and the service app executing part 33 displays the information for the list of change services in step S114.

Next, in step S116, the service app executing part 33 reports, to the ID server 10 via the communication part 31, information for a service (which is the service A, here) to be changed. Next, in step S118, the service app executing part 33 installs the service permission information for the service (which is the service A by the service server A 20a) from the ID server 10. Then, in step S120, the terminal device A 30 waits for a coupling request from the service server A through coordination between the ID server 10 and the service server A 20a. Upon the connection request from the service server A, the communication part 31 is coupled to the service server A in step S122.

Next, in step S124, the service app executing part 33 installs the module A, which is for executing the service A, transmitted from the server A 20a. Upon completing the installation of the module A, the communication part 31 notifies the ID server 10 in step S126, obtains the registration completion notification from the ID server 10 in step S128, and then the processing is completed. When the communication part 31 receives the registration completion notification from the ID server 10, the service A becomes able to be used by the terminal device A.

[Authentication/installation processing of terminal device B]

Figure 12:
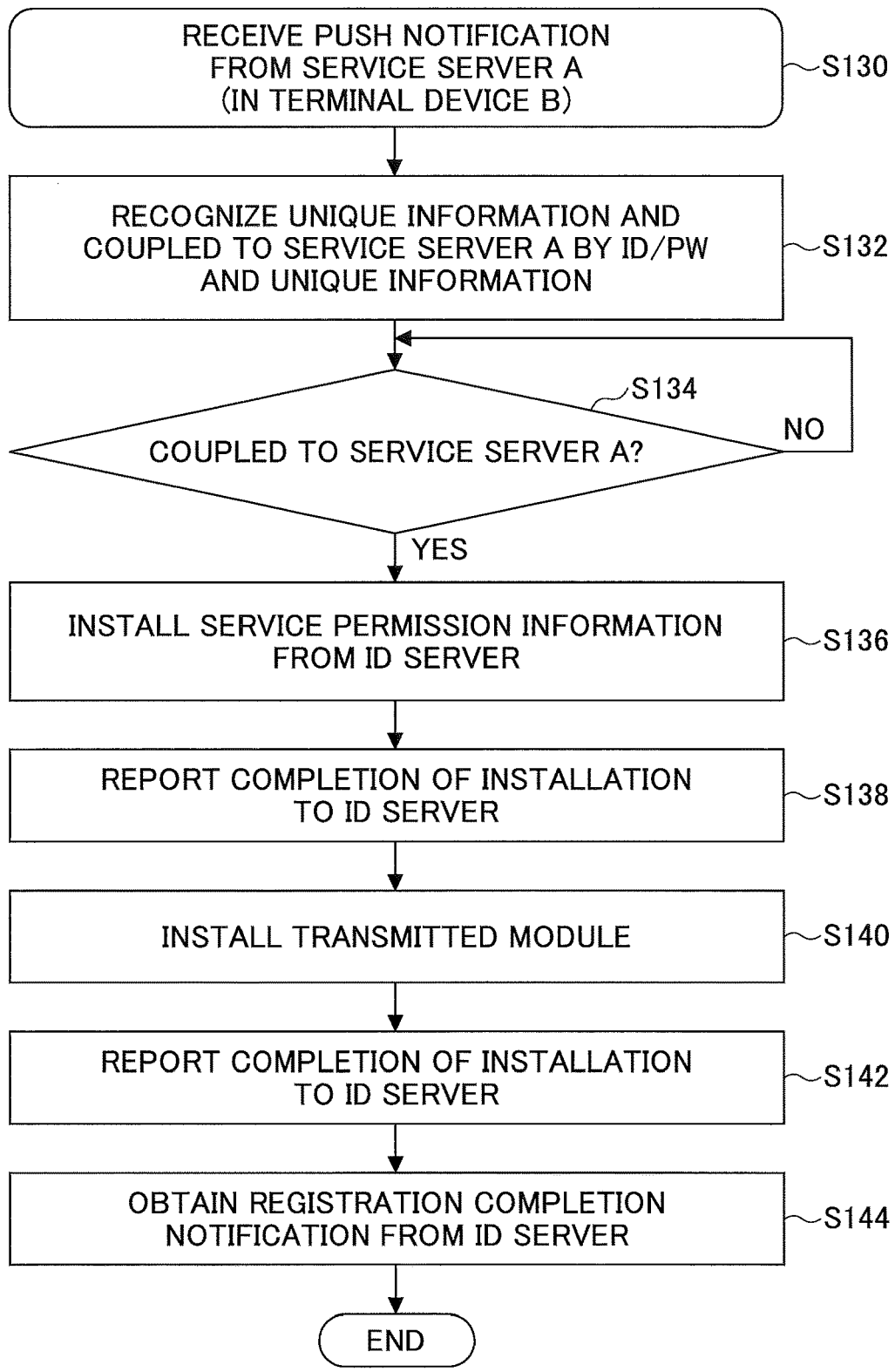
FIG. 12 is a flowchart illustrating an example of authentication/installation processing of a terminal device B according to the embodiment.

Next, authentication/installation processing of the terminal device B 40 according to the embodiment will be described with reference to FIG. 12. When the processing of FIG. 12 is started, the communication part 41 of the terminal device B receives a push notification from the service server A 20a in step S130. The communication part of the service server A 20a transmits service permission information to the terminal device B 40 based on the terminal device information 154 stored in the service management DB 15 that the ID server stores. The unique information is given to the information of the push notification.

The logon processing part 42 is coupled to the service server A 20a by the unique information and the ID/PW in step S132. The service server A 20a performs substitute authentication of the terminal device B 40 in place of the ID server 10. At this time, information for the ID/PW is held in the terminal device B 40, and thereby the user can perform the logon operation without inputting the ID/PW.

In step S134, the terminal device B 40 determines, through the coordination between the service server A 20a and the ID server 10, whether the terminal device B 40 is coupled to the service server A. Upon being coupled to the service server A, the communication part 41 receives the permission information for the service (which is the service A, here) transmitted from the ID server 10, and the service app executing part 43 installs the received information in the service A permission information in step S136. Upon the communication part 41 reporting the completion of installing the service permission information to the ID server 10 in step S138, the service app executing part 43 installs the module, transmitted from the service server A 20a, in the app for using the service A in step S140. Upon completing the installation of the module A, the communication part 41 notifies the ID server 10 in step S142, obtains the registration completion notification from the ID server 10 in step S144, and then the processing is completed. In this way, the service A becomes able to be used by the terminal device B 40.

As described above, the authentication of the terminal device A 30 and the substitute authentication of the terminal device B 40 are performed by the coordination between the service server A 20a and the ID server 10. However, the embodiment is not limited to this but the authentication of the terminal device A 30 and the substitute authentication of the terminal device B may be performed by coordination between the service server B 20b and the ID server 10. Further, the authentication of the terminal device B 40 and the substitute authentication of the terminal device A 30 may be performed by the coordination between the ID server 10, the service server A 20a, and/or the service server B 20b.

As described above, according to the device coordination authentication method of the embodiment, the service server A 20a or the service server B 20b performs substitute authentication for the ID server 10. In this way, it is possible to reduce frequent access to the ID server 10 from the service A 20a and the service server B 20b. Thus, it is possible to reduce the communication volume between the ID server 10 and the service server A 20a, and the communication volume between the ID server 10 and the service server B 20b. Further, because the access between the servers can be reduced, the necessity for high speed processing in the ID server 10 is reduced. Hence, it is possible to reduce cost of the server system. As a result, providing services using a Web service based on the device coordination authentication system 1, whose costs to communication and the server system are reduced, can be realized.

(Hardware configuration example)

Figure 13:
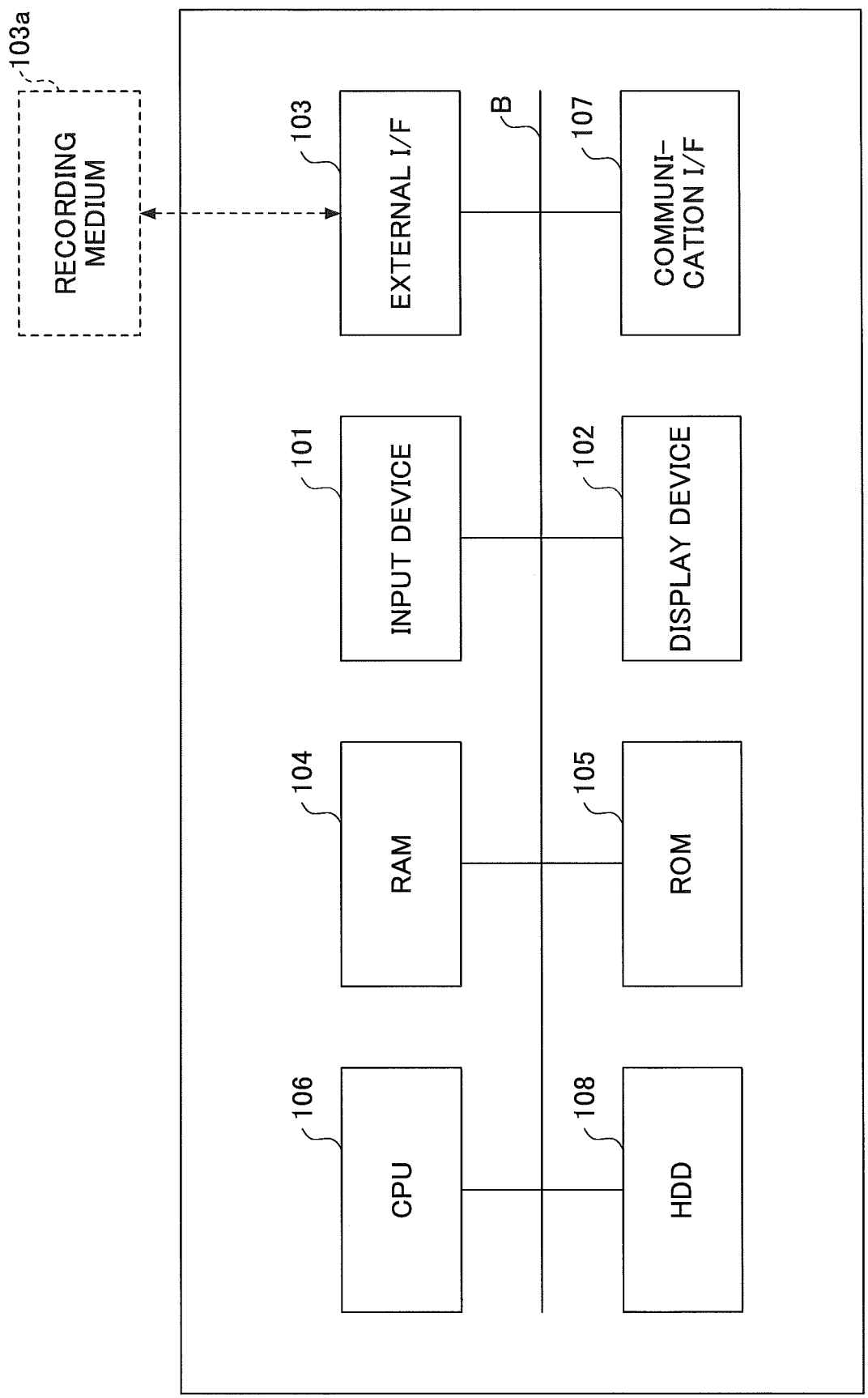
FIG. 13 is a diagram illustrating an example of a hardware configuration of a service server according to the embodiment.

Finally, a hardware configuration of the service server according to the embodiment will be described with reference to FIG. 13. FIG. 13 illustrates an example of the hardware configuration of the service server according to the embodiment. The service server includes an input device 101, a display device 102, an external I/F 103, a Random Access Memory (RAM) 104, a Read Only Memory (ROM) 105, a Central Processing Unit (CPU) 106, a communication I/F 107, and a Hard Disk Drive (HDD) 108 that are coupled with each other via a bus B.

The input device 101 includes a keyboard, a mouse, and the like. The input device 101 is used to input various operation signals to the service server. The display device 102 includes a display and the like to display various processing results. The communication I/F 107 is an interface that couples the service server to a network. Thus, the service server can perform data communication with other devices (such as the terminal device A 30, the terminal device B 40, and the ID server 10) via the communication I/F 107.

The HDD 108 is a non-volatile storage device that stores programs and data. The stored programs and the stored data include application software and basic software for controlling the entire service server. For example, various databases, programs, and the like may be stored in the HDD 108.

The external I/F 103 is an interface with an external apparatus. The external apparatus may be a recording medium 103*a*. Thus, the service server can read/write information (data) from/on the recording medium 103*a* via the external I/F 103. The recording medium 103*a* may be a floppy (registered trademark) disk, a Compact Disk (CD), a Digital Versatile Disk (DVD), a SD memory card, a Universal Serial Bus (USB) memory, or the like.

The ROM 105 is a non-volatile semiconductor memory (storage device) that can hold programs and data even when being powered off. Data and programs such as network settings are stored in the ROM 105. The RAM 104 is a volatile semiconductor memory (storage device) that temporarily holds programs and data. The CPU 106 is an arithmetic device that reads, from the above described storage device such as the ROM 105 and the HDD 108, for example, programs and/or data onto the RAM 104 to execute processing such that control for the entire apparatus and mounted functions are realized.

In the service server according to the embodiment having the configuration as described above, the CPU 106 uses data and programs stored in the ROM 105 and/or the HDD 108 to execute the authentication/installation processing. Note that the information stored in the service management DB, the ID management DB, the authentication table, the logon management DB, and the push management DB may be stored in the RAM 104, the HDD 108, or a cloud server coupled to the service server via a network.

The information processing apparatus, the device coordination authentication program and the device coordination authentication method are described above with reference to the embodiment. However, the information processing apparatus, the device coordination authentication program and the device coordination authentication method according to the present invention are not limited to the above described embodiment, and various variations and modifications may be made without departing from the spirit and scope of the present invention. Further, if there are a plurality of embodiments and variation examples, they may be combined as long as a contradiction does not occur.

For example, the configuration of the authentication/installation processing according to the embodiment described above is just an example, and does not limit the spirit and scope of the present invention. Various system configurations may be used depending on uses and purposes. For example, the system structure of the device coordination authentication system 1 according to the embodiment, in which the ID server 10, the service server A 20*a*, the service server B 20*b*, the terminal device A 30, the terminal device B 40 are coupled to each other via the network NT, is just an example, and the present invention is not limited to this. For example, the number of each of the devices, which are the service server A 20*a*, the service server B 20*b*, the terminal device A, the terminal device B, included in the device coordination authentication system 1 according to the embodiment may be one or two or more.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store a program;
a hardware processor configured to execute the program so as to perform processing, the processing including:
  receiving first authentication information for a first terminal device that has been authenticated by an authentication server, the first terminal device being one of a plurality of terminal devices that are authenticatable by the same authentication information;
  identifying a second terminal device among the plurality of terminal devices that has not been authenticated by the authentication server;
  obtaining second authentication information from the second terminal device;
  authenticating the second terminal device without using the authentication server based on the second authentication information from the second terminal device and the first authentication information for the first terminal device;
  receiving service duration information that represents a service duration for providing a service to the first terminal device; and
  completing the authenticating of the second terminal device in place of the authentication server within the service duration represented by the service duration information; and
a logon information database that stores logon information of the plurality of terminal devices,
wherein the processing further includes:
  updating the logon information for the second terminal device when the authentication information for the first terminal device is received; and
  after the updating of the logon information, starting the authenticating of the second terminal device without using the authentication server based on the logon information.

2. The information processing apparatus according to claim 1, wherein the processing further includes
receiving authentication duration information that represents an authentication duration for authenticating the second terminal device in place of the authentication server, and
completing the authenticating of the second terminal device in place of the authentication server within the authentication duration represented by the authentication duration information.

3. A computer program product embodying a device coordination authentication program stored on a non-transitory computer-readable recording medium for causing a computer to execute the device coordination authentication program by a hardware processor so as to perform the steps of:
receiving first authentication information for a first terminal device that has been authenticated by an authentication server, the first terminal device being one of a plurality of terminal devices that are authenticatable by the same authentication information;
identifying a second terminal device among the plurality of terminal devices that has not been authenticated by the authentication server;
obtaining second authentication information from the second terminal device;
authenticating the second terminal device without using the authentication server based on the second authentication information from the second terminal device and the first authentication information for the first terminal device;
receiving service duration information that represents a service duration for providing a service to the first terminal device;
completing the authenticating of the second terminal device in place of the authentication server within the service duration represented by the service duration information;
storing logon information of the plurality of terminal devices in a logon information database;
updating the logon information for the second terminal device when the authentication information for the first terminal device is received; and
after the updating of the logon information, starting the authenticating of the second terminal device without using the authentication server based on the logon information.

4. A device coordination authentication method for causing a computer to execute a process by a hardware processor, the method comprising executing on the hardware processor the steps of:
receiving first authentication information for a first terminal device that has been authenticated by an authentication server, the first terminal device being one of a plurality of terminal devices that are authenticatable by the same authentication information;
identifying a second terminal device among the plurality of terminal devices that has not been authenticated by the authentication server;
obtaining second authentication information from the second terminal device;
authenticating the second terminal device without using the authentication server based on the second authentication information from the second terminal device and the first authentication information for the first terminal device;
receiving service duration information that represents a service duration for providing a service to the first terminal device;
completing the authenticating of the second terminal device in place of the authentication server within the duration represented by the duration information;
storing logon information of the plurality of terminal devices in a logon information database;
updating the logon information for the second terminal device when the authentication information for the first terminal device is received; and
after the updating of the logon information, starting the authenticating of the second terminal device without using the authentication server based on the logon information.

* * * * *